(12) United States Patent
Amizur et al.

(10) Patent No.: US 10,466,337 B2
(45) Date of Patent: Nov. 5, 2019

(54) TECHNIQUES FOR WIRELESS TIME-OF-FLIGHT CALCULATION COMPLEXITY REDUCTION

(71) Applicants: Yuval Amizur, Kfar-Saba (IL); Uri Schatzberg, Kiryat Ono (IL); Leor Banin, Petach Tikva (IL)

(72) Inventors: Yuval Amizur, Kfar-Saba (IL); Uri Schatzberg, Kiryat Ono (IL); Leor Banin, Petach Tikva (IL)

(73) Assignee: INTEL IP CORPORATION, Santa Clara, CA (US)

(*) Notice: Subject to any disclaimer, the term of this patent is extended or adjusted under 35 U.S.C. 154(b) by 486 days.

(21) Appl. No.: 15/026,757

(22) PCT Filed: Dec. 10, 2013

(86) PCT No.: PCT/US2013/074093
§ 371 (c)(1),
(2) Date: Apr. 1, 2016

(87) PCT Pub. No.: WO2015/088496
PCT Pub. Date: Jun. 18, 2015

(65) Prior Publication Data
US 2016/0291122 A1 Oct. 6, 2016

(51) Int. Cl.
*G01S 19/22* (2010.01)
*G01S 5/02* (2010.01)
(Continued)

(52) U.S. Cl.
CPC .......... *G01S 5/0273* (2013.01); *G01S 5/0215* (2013.01); *G01S 19/22* (2013.01); *G01S 5/06* (2013.01); *G01S 19/24* (2013.01); *G01S 19/38* (2013.01)

(58) Field of Classification Search
CPC ........ G01S 5/0273; G01S 5/06; G01S 5/0215; G01S 19/22; G01S 19/24; G01S 19/38
(Continued)

(56) References Cited

U.S. PATENT DOCUMENTS

| 5,630,208 A | * | 5/1997 | Enge | ...................... | H04B 1/711 375/232 |
| 7,292,189 B2 | * | 11/2007 | Orr | ........................ | G01S 5/0215 342/387 |

(Continued)

FOREIGN PATENT DOCUMENTS

| EP | 2017638 A2 | 1/2009 |
| WO | 2013032285 A2 | 3/2013 |
| WO | 2013100970 A1 | 7/2013 |

OTHER PUBLICATIONS

International Search Report dated Sep. 4, 2014 in International Patent Application No. PCT/US2013/074093.

*Primary Examiner* — Chuong P Nguyen

(57) ABSTRACT

Examples are disclosed for determining a time-of-flight (ToF) of a wireless signal in a multipath wireless environment. In some examples a method for determining a time-of-flight (ToF) of a wireless signal in a multipath wireless environment may comprise receiving two or more wireless signals over a wireless communication channel from wireless device, determining a maximum likelihood solution for identifying a line-of-sight (LoS) signal of the two or more wireless signals, reducing the complexity of the maximum likelihood solution, determining a time that maximizes the reduced complexity maximum likelihood solution, and determining the ToF of the LoS signal based on the reduced complexity maximum likelihood solution and the determined time. Other examples are described and claimed.

25 Claims, 9 Drawing Sheets

(51) Int. Cl.
  *G01S 19/38* (2010.01)
  *G01S 5/06* (2006.01)
  *G01S 19/24* (2010.01)

(58) Field of Classification Search
  USPC .......................... 342/357.21, 357.61, 357.63
  See application file for complete search history.

(56) References Cited

U.S. PATENT DOCUMENTS

| | | | | |
|---|---|---|---|---|
| 7,468,696 | B2 * | 12/2008 | Bornholdt | G01S 5/0215 |
| | | | | 342/387 |
| 7,519,136 | B2 * | 4/2009 | Qi | H04W 64/00 |
| | | | | 375/316 |
| 7,969,311 | B2 * | 6/2011 | Markhovsky | G01S 3/74 |
| | | | | 235/375 |
| 8,184,504 | B2 * | 5/2012 | Altman | G01S 5/021 |
| | | | | 367/124 |
| 9,207,305 | B2 * | 12/2015 | AlSindi | G01S 5/0215 |
| 9,246,723 | B2 * | 1/2016 | Amizur | G01S 5/0215 |
| 9,261,580 | B2 * | 2/2016 | Banin | G01S 5/0205 |
| 9,304,184 | B1 * | 4/2016 | Draganov | G01S 19/22 |
| 9,380,471 | B2 * | 6/2016 | Amizur | H04W 24/00 |
| 9,629,116 | B2 * | 4/2017 | Schatzberg | H04W 64/00 |
| 2009/0058729 | A1 * | 3/2009 | Jo | G01S 5/021 |
| | | | | 342/387 |
| 2010/0085838 | A1 | 4/2010 | Altman et al. | |
| 2013/0271324 | A1 * | 10/2013 | Sendonaris | G01S 5/02 |
| | | | | 342/450 |
| 2013/0273935 | A1 | 10/2013 | Amizur et al. | |
| 2016/0252620 | A1 * | 9/2016 | Surinder | G01S 19/22 |
| | | | | 342/357.61 |
| 2016/0282447 | A1 * | 9/2016 | Amizur | H04W 24/00 |

\* cited by examiner

440

460

DECIMATE A CHANNEL ESTIMATION OF THE
MAXIMUM LIKELIHOOD SOLUTION
462

DETERMINE THE TIME THAT MAXIMIZES THE
REDUCED COMPLEXITY MAXIMUM
LIKELIHOOD SOLUTION BASED ON THE
DECIMATED CHANNEL ESTIMATION
464

*FIG. 4D*

TECHNIQUES FOR WIRELESS TIME-OF-FLIGHT CALCULATION COMPLEXITY REDUCTION

TECHNICAL FIELD

Examples described herein are generally related to techniques for reducing the complexity of calculating wireless time-of-flight (ToF) for wireless signals.

BACKGROUND

Wireless devices may include capabilities to access the Internet or to connect with other wireless devices using various wireless access technologies. For example, wireless devices may communicatively couple to a wireless local area network (WLAN) using wireless technologies such as WiFi™. A wireless device using Wi-Fi wireless technologies may, for example, couple to the WLAN through an access point. As the capabilities and functionality of wireless devices continue to increase, it may be advantageous for access points and other wireless devices to track or otherwise be aware of the location of a particular wireless device. Existing solutions such as global-navigation-satellite-systems (GNSS) may assist with this location awareness when a wireless device is in an outdoor environment or signal reception is not otherwise obstructed, certain difficulties arise when attempting to determine a location of a wireless device located in an indoor environment or in an environment that otherwise obstructs the sending and/or receiving of satellite signals. Consequently, a need exists to improve techniques for determining a location of a wireless device in an indoor or other satellite-obstructed environment. It is with respect to these and other considerations that the embodiments described herein are needed.

BRIEF DESCRIPTION OF THE DRAWINGS

FIG. 4D illustrates an example of a fourth logic flow.

DETAILED DESCRIPTION

Figure 1:
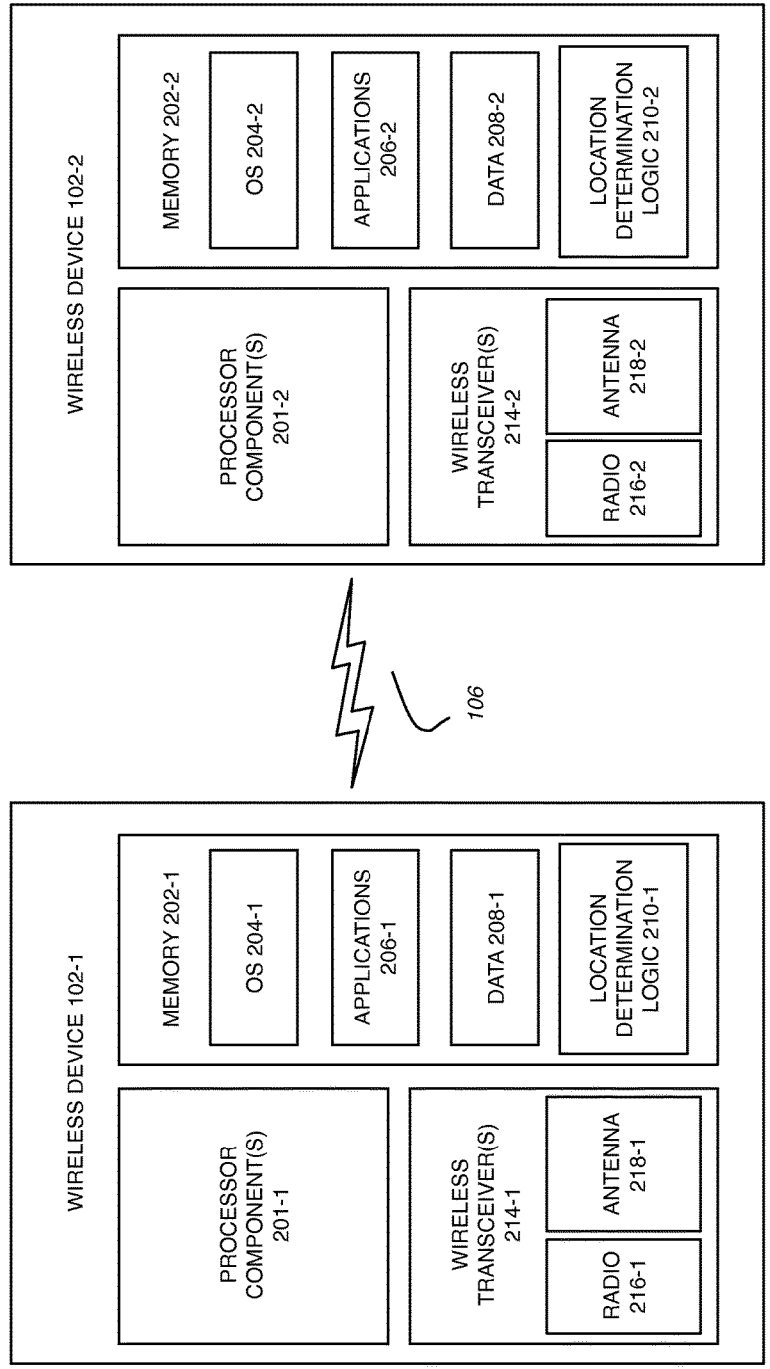
FIG. 1 illustrates an example of a system.

Examples are generally directed to improvements for wireless devices to enable indoor navigation or location tracking of wireless devices by reducing the complexity of calculating wireless time-of-flight (ToF) for wireless signals. The wireless technologies described herein may include wireless technologies suitable for use with wireless devices or user equipment (UE) or access points deployed in a WLAN. For example, wireless devices or access points for a WLAN may be configured to operate in compliance with various WLAN standards promulgated by the Institute of Electrical Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

While described herein as relating to WLAN and/or Wi-Fi technologies and standards, this disclosure is not limited to WLAN related standards, but may also apply to wireless wide area networks (WWANs) and 3G or 4G wireless standards (including progenies and variants) related to access points, wireless devices, UEs or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

In some examples regarding WLANs, various IEEE standards associated with IEEE 802.11 such as IEEE 802.11a/g, IEEE 802.11ac, IEEE 802.11ad or IEEE 802.11ah may be utilized by wireless devices or access points to establish or maintain communication links within a WLAN. Also, wireless device or access points may seek to obtain IP addresses in accordance with various Dynamic Host Control Protocol (DHCP) standards such as those described in Internet Engineering Task Force (IETF) Request for Comments (RFC) 2131, published March 1997, described in IETF RFC 3315, published July 2003 or described in IETF RFC 6422, published December 2011.

Outdoor navigation is widely deployed thanks to the development of various GNSS systems including but not limited to global positioning systems (GPS), Global Navigation Satellite Systems (GLONASS). GALILEO system and the like. These systems work in general by providing location and time information to properly equipped wireless devices anywhere on or near the Earth where there is an unobstructed line-of-sight (LoS) to a plurality of satellites. While these systems work very well in outdoor environments, they suffer due to the requirement of an unobstructed LoS in indoor and other obstructed LoS environments. As used herein, the term LoS may refer to propagation of a radio and/or wireless signal in a straight line and/or directly from a transmitter to a receiver. Other embodiments are described and claimed.

The need for indoor navigation has continued to increase as the power, functionality and usefulness of wireless devices has continued to increase. For example, it may be advantageous to provide indoor direction or navigation functionality to a user of a wireless device inside a shopping mall or conference center, or to provide location based reminders, advertisements, etc. to a user of a wireless device. These and other scenarios have increased the need to enable indoor navigation. The field of indoor navigation, however, differs from outdoor navigation since the indoor environment does not enable the reception of signals from GNSS satellites. Current solutions for indoor navigation have yet to solve this and other problems in a scalable manner that provides satisfactory precision.

Various embodiments described herein may comprise techniques for improved indoor navigation using a time-of-flight (ToF) method. ToF as used herein may comprise the overall time a signal propagates from a first wireless device to a second wireless device and back to the first wireless device. ToF distance and/or range calculations depend on determining a signal received time. In a multipath environment where multiple replicas of a signal are received, this task is very computationally intensive, limiting the effectiveness and/or usefulness of these systems. For example, accurate calculations require that the received time be accurately identified as corresponding to the LoS component and not one of many replica signals that may be present in an indoor environment. Stated differently, the received time must be that of the signal that propagated directly from the transmitter to the receiver to ensure accurate range calculation. Once correctly identified, the ToF of the LoS component can be converted into distance by dividing the time by two and multiplying it by the speed of light. Identifying the ToF of the LoF signal, however, requires a great deal of processing power and a large number of computations. Therefore, various embodiments described herein may reduce the complexity of the calculations required to determine the ToF of a LoS wireless signal to enable indoor navigation. The embodiments are not limited in this respect.

Various embodiments described herein refer to a maximum likelihood solution and/or a maximum likelihood algorithm. One skilled in the art will readily understand that a maximum likelihood solution and/or a maximum likelihood algorithm as used herein includes but is not limited to a method of estimating one or more parameters of a statistical model. Furthermore, it should also be understood that use of the terms maximum, maximize, and the like in any context herein is not intended to be limited to only a single value. Instead, these terms may refer to a range of possible values that may vary based on any number of factors including but not limited to sample size, mathematical complexity, time of arrival of a first path signal, differing numbers of paths, time of arrival of all path signals, amplitude of path signals, receipt of multiple samples from multiple antennas and the like. As such, the embodiments are not limited in this context.

In some examples, techniques are implemented for reducing the complexity of ToF calculations for wireless signals when searching for and/or identifying a LoS component. In various embodiments these techniques include receiving two or more wireless signals over a wireless communication channel, determining a maximum likelihood solution for identifying a LoS signal of the two or more wireless signals, reducing the complexity of the maximum likelihood solution, determining a time that maximizes the reduced complexity maximum likelihood solution, determining a ToF of the LoS signal based on the reduced complexity maximum likelihood solution and the determined time, and determining a location of the computing device based on the determined ToF. The embodiments are not limited in this respect.

FIG. 1 illustrates an example system 100. As shown in FIG. 1, in some embodiments, system 100 may include a wireless communication network including one or more wireless communication devices, e.g., wireless communication devices 102-1 and 102-2, capable of communicating content, data, information and/or signals over a wireless communication channel 106, for example, a radio channel, an IR channel, a RF channel, a Wireless Fidelity (WiFi) channel, and the like. One or more elements of system 100 may optionally also/alternatively be capable of communicating over any suitable wired communication link. While not limited in this respect, in some embodiments described herein the wireless devices 102-1 and 102-2 may comprise a user equipment (UE) device 102-1 and an access point (AP) device 102-2 in a WiFi network. Although the wireless devices 102-1, 102-2 shown in FIG. 1 have a limited number of elements in a certain topology or configuration, it may be appreciated that the wireless devices 102-1, 102-2 may include more or less elements in alternate configurations as desired for a given implementation. Other embodiments are described and claimed.

In various embodiments, wireless communication devices 102-1 and/or 102-2 may include or may be implemented as part of a wireless, mobile or portable device. For example, wireless communication devices 102-1 and/or 102-2 may include or may be implemented as part a mobile computer, a laptop computer, a notebook computer, a smartphone, a UE device, an AP device, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

System 100 may include an indoor-based system located within an indoor premises and/or location, e.g., a building, a shop, an office, a shopping center, a mall, and the like in some embodiments. In other embodiments, system 100 may include an outdoor system located outdoors and/or in a combination with one or more indoor locations, e.g., one or more buildings, and/or one or more outdoor locations. In one example, system 100 may be deployed within a shopping center or a campus. While described herein as comprising an indoor location, one skilled in the art will readily understand that the embodiments are not limited in this respect. For example, the techniques described herein could also be used in other environments as well. As such, the embodiments are not limited in this respect.

Wireless communication devices 102-1 and/or 102-2 may include, for example, one or more processor components 201-1, 201-2, memory 202-1, 202-1 and wireless transceivers 214-1, 214-2. Wireless communication devices 102-1 and/or 102-2 may optionally include other suitable hardware components and/or software components and are not limited to the number, type or arrangement of components shown in FIG. 1. Moreover, while shown in FIG. 1 as having the same components, it should be understood that wireless devices 102-1 and 102-2 may include different components, arrangement of components, etc. from one another and still fall within the described embodiments. In some embodiments, some or all of the components of one or more of wireless communication devices 102-1 or 102-2 may be enclosed in a common housing or packaging, and may be interconnected or operably associated using one or more wired or wireless links. In other embodiments, components of one or more of wireless communication devices 102-1 or 102-2 may be distributed among multiple or separate devices.

Processor components 201-1, 201-2 may comprise, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor components 201-1, 201-2 may be operative to execute instructions, for example, of an Operating System (OS) 204-1, 204-2 of wireless communication devices 102-1, 102-2, one or more suitable applications 206-1, 206-2, and/or location determination logic 210-1, 210-2.

Processor components 201-1, 201-2 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor components 201-1, 201-2. According to some examples processor components 201-1, 201-2 may also be application specific integrated circuits (ASIC) and other components of wireless devices 102-1, 102-2 may be implemented as hardware elements of the ASIC. Processor components 201-1, 201-2 may be a single processing unit or a number of processing units, all of which may include single or multiple computing units or multiple cores. The processor components 201-1, 201-2 may be implemented as one or more microprocessors, microcomputers, microcontrollers, digital signal processors, central processing units, state machines, logic circuitries, and/or any devices that manipulate signals based on operational instructions. Among other capabilities, the processor components 201-1, 201-2 may be configured to fetch and execute computer-readable instructions or processor-accessible instructions stored in a memory 202-1, 202-2 or other computer-readable storage media.

While not shown in FIG. 1, wireless devices 102-1, 102-2 may include input/out units that may include, for example, a keyboard, a keypad, a mouse, a touch-pad, a track-ball, a stylus, a microphone, or other suitable pointing device or input device, a monitor, a screen, a flat panel display, a Cathode Ray Tube (CRT) display unit, a Liquid Crystal Display (LCD) display unit, a plasma display unit, a touch sensitive display, one or more audio speakers or earphones, or other suitable output devices. The embodiments are not limited in this respect.

In various embodiments, memory 201-1, 201-2 may comprise a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 146 includes, for example, a hard disk drive, a floppy disk drive, a Compact Disk (CD) drive, a CD-ROM drive, a DVD drive, or other suitable removable or non-removable storage units. As shown in FIG. 1, Memory 202-1, 202-2 may store, among other things, OS 204-1, 204-2, applications 206-1, 206-2, data 208-1, 208-2 and/or location determination logic 210-1, 210-2, one or more of which may be executed by processor components 201-1, 201-2 and/or otherwise processed by wireless communication devices 102-1, 102-2 in some embodiments.

Memory 202-1, 202-2 is an example of non-transitory computer-readable storage media for storing instructions to be executed by the processor components 201-1, 201-2 to perform the various functions described herein. For example, memory 202-1, 202-2 may generally include both volatile memory and non-volatile memory (e.g., RAM, ROM, or the like). Memory 202-1, 202-2 may be referred to as memory or computer-readable storage media herein. Memory 202-1, 202-2 is capable of storing computer-readable, processor-executable program instructions as computer program code that may be executed by the processor components 201-1, 201-2 as a particular machine configured for carrying out the operations and functions described in the implementations herein.

Memory 202-1, 202-2 may include one or more operating systems 204-1, 204-2, and may store one or more applications 206-1, 206-2. The operating systems 204-1, 204-2 may be one of various known and future operating systems implemented for personal computers, audio video devices, mobile devices, smartphones, tablets and the like. The applications 206-1, 206-2 may include preconfigured/installed and downloadable applications. In addition, memory 202-1, 202-2 may include data 208-1, 208-2 to store the installed and downloaded applications. The embodiments are not limited in this respect.

Memory 202-1, 202-2 includes location determination logic 210-1, 210-2 that may be configured to determine a maximum likelihood solution for identifying a LoS signal between the wireless devices 102-1, 102-2 and reduce the complexity of the maximum likelihood solution to determine a ToF of the LoS signal based on the reduced complexity maximum likelihood solution and to determine a location of a wireless device 102-1, 102-2 based on the determined ToF in some embodiments. For example, the location determination logic 210-1, 210-2 may enable wireless device 102-1 and/or wireless device 102-2 to determine a distance between the wireless devices 102-1, 102, 2 as described in more detail elsewhere herein.

According to some examples, wireless devices 102-1, 102-2 may be part of wireless devices such as a smartphone and an access point, for example, that may be capable of operating in compliance with one or more wireless technologies or standards such as WLAN and/or Wi-Fi wireless technologies. For example, the wireless devices 102-1, 102-2 may be arranged or configured to wirelessly couple with or communicate with one another via communication channel and/or medium 106. The embodiments are not limited in this context.

Wireless devices 102-1, 102-2 may include wireless transceivers 214-1, 214-2 in some embodiments. In various embodiments, wireless transceivers 214-1, 214-2 may include radios 216-1, 216-2 and antennas 218-1, 218-2. In an implementation, the radios 216-1, 216-2 and antennas 218-1, 218-2 may be used to establish a wireless connection with, for example, the other respective wireless device 102-1, 102-2 or another wireless device (not shown in FIG. 1). Antennas 218-1, 218-2 may comprise or include any type of antennas suitable for transmitting and/or receiving wireless communication signals, blocks, frames, transmission streams, packets, messages and/or data, e.g., over channel 106. For example, antennas 218-1, 218-2 may include any suitable configuration, structure and/or arrangement of one or more antenna elements, components, units, assemblies and/or arrays. Antennas 218-1, 218-2 may include an antenna covered by a quasi-omni antenna pattern. For example, antennas 218-1, 218-2 may include at least one of a phased array antenna, a single element antenna, a set of switched beam antennas, and the like. In some embodiments, antennas 218-1, 218-2 may implement transmit and receive functionalities using separate transmit and receive antenna elements. In some embodiments, antennas 218-1, 218-2 may implement transmit and receive functionalities using common and/or integrated transmit/receive elements. The embodiments are not limited in this respect.

The example wireless devices 102-1, 102-2 described herein are merely examples that are suitable for some implementations and are not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, a computer program product may implement the processes and components described herein.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Figure 2:
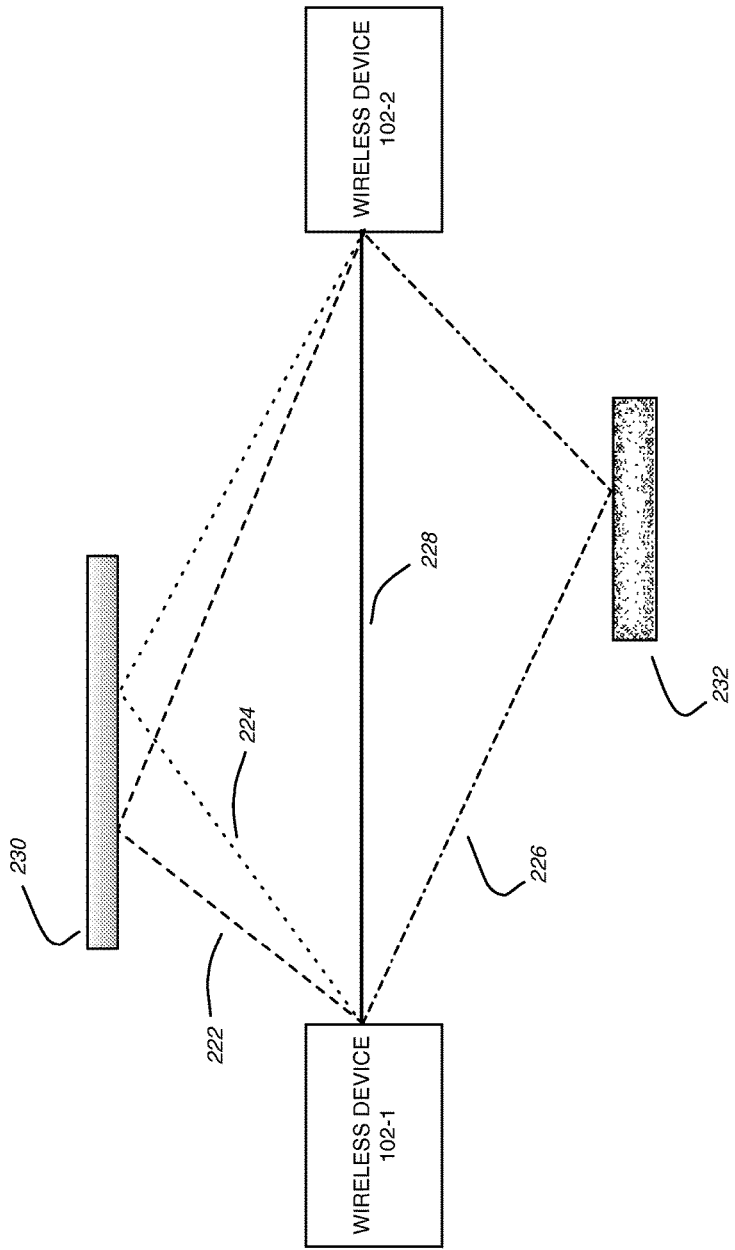
FIG. 2 illustrates an example signal diagram.

FIG. 2 illustrates an example signal diagram 200. In various embodiments, the signal diagram 200 illustrates, as an example, wireless communications (e.g. via wireless signals 222, 224, 226 and/or 228) between wireless devices 102-1 and 102-2 in a multipath environment. In various embodiments, the wireless devices 102-1, 102-2 may be the same or similar to wireless devices 102-1, 102-2 shown in FIG. 1. While not limited in this respect, the multipath environment may comprise an indoor environment in some embodiments where any number of objects 230, 232 are present that cause reflection of a wireless signal. For example, in the embodiment shown in FIG. 2, wireless signals 222, 224 and 226 may be replicas or reflections of the direct LoS wireless signal 228. The embodiments are not limited in this respect.

In a wireless system or environment, multipath may comprise the propagation phenomenon that results in wireless and/or radio signals reaching a receiving antenna by two or more paths. Causes of multipath may include but are not limited to atmospheric ducting, ionospheric reflection and refraction, and reflection from bodies or objects (walls, ceilings, floors, people, signs, etc.) and terrestrial objects such as mountains and buildings. The effects of multipath include constructive and destructive interference, phase shifting of the signal and/or fading. In the embodiments shown in FIG. 2, the multipath may be caused by reflections of the objects 230, 232 that may comprise, for example, walls, ceilings and or floors of a building or structure. Due to the different paths that the signals 222, 224 and 226 take propagate from wireless device 102-1 to wireless device 102-2 compared to the LoS signal 228, the signals 222, 224, 226 and 228 may arrive at wireless device 102-2 at different times.

Figure 3:
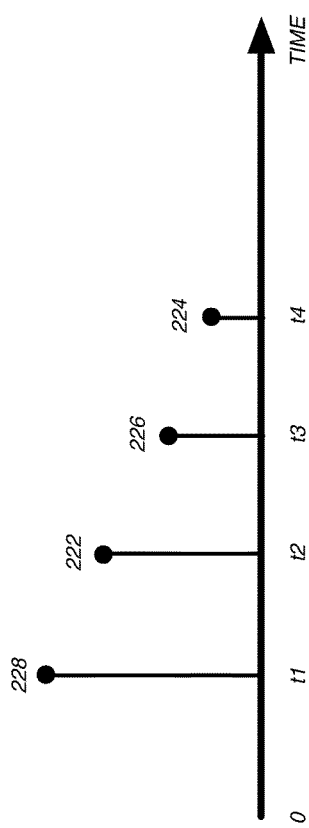
FIG. 3 illustrates an example timing diagram.

FIG. 3 illustrates a timing diagram 300 in some embodiments. For example, the timing diagram 300 may illustrate the different receive times t1, t2, t3 and t4 for the wireless signals 228, 222, 226 and 224 respectively. More particularly, the timing diagram 300 may illustrate that the LoS wireless signal 228 is received at wireless device 102-2 at t1 and the replica signals 222, 226 and 224 are received at times t2, t3 and t4 respectively. While a limited number of times, signals, devices and objects are shown in FIGS. 2 and 3, it should be understood that the embodiments are not limited this respect and that other numbers and arrangements are possible and still fall within the described embodiments.

To enable indoor navigation, accurate ToF calculations must be performed. For example, ToF range calculations depend on determining a signal received time for a LoF wireless signal.

In a multipath environment as shown in FIGS. 2 and 3, where multiple replicas (e.g. 222, 224 and 226) of the signal (e.g. 228) are received, this task is very difficult. Proper calculations require a determination of the received time of the LoS signal 228. That is, the received time of the signal 228 that propagated directly from wireless device 102-1 to wireless device 102-2. There are several methods and/or mathematical models to calculate the ToF of the LoS signal 228. At the receiver (e.g. at wireless device 102-2), due to the presence of the multiple wireless signals, more than one wireless signal will be received, and each of the received wireless signals will arrive at different times. In fact, since the wireless signals travel at the speed of light, and since every path has a geometrical length possibly different from that of the other ones, there is different air travelling times. One particular method for determining and/or estimating the ToF of the LoS signal in a multipath environment as described above is a maximum-likelihood (ML) algorithm. The embodiments, however, are not limited in this respect.

In various embodiments, a ML algorithm or ML estimator may be implemented at both wireless devices 102-1, 102-2 (e.g. at the STA and AP side). The complexity of the ML algorithm that is used may determine how many wireless devices (STAs) that a given wireless device (AP) can service. Stated differently, the number of wireless devices (STAs) that can utilize ToF navigation in a certain region is bounded by the complexity of the ML algorithm at the AP wireless device. Moreover, complexity issues also determine whether the ML algorithm can be implemented in hardware or in software. If the algorithm is too complex, it will have to be implemented in hardware which increases product costs and delays the development process.

In various embodiments, ML LoS estimation is based on calculating a cost function Q(t) for different times (t) and searching for the time which maximizes Q(t) as shown below in equation 1:

$$Q(t) = -y^* \cdot K_y^{-1} \cdot y = \qquad (1)$$
$$-y^* \cdot [G \cdot K \cdot G^* + \sigma^2 \cdot I]^{-1} \cdot y = -y^* \cdot G \cdot [K_b + \sigma^2 \cdot I]^{-1} \cdot G^* \cdot y =$$
$$Q(t) = y^* \cdot G \cdot \left[L + \frac{1}{\sigma^2} \cdot I\right] \cdot G^* \cdot y = y^* \cdot G \cdot L \cdot G^* \cdot y + \frac{1}{\sigma^2} y^* \cdot y$$

Where y=channel estimation and $K_y$=covariance.

Because that the second expression does not depend on t and only G is a function of t, you can neglect this term and can break the covariance into a few variables when trying to find maximum of Q(t) and can attempt to find the maximum using equation 2 shown below:

$$Q(t) = y^* \cdot G \cdot L \cdot G^* \cdot y \qquad (2)$$

The dimensions of one or more matrices derived from equation 2 can be expressed as:

Y–1*117

G–117*117 diagonal

L–117*117

Based on these dimension, in various embodiments, a large number of calculations would be required to find t that maximizes Q(t). For example, using the numbers shown above, the number of required calculations could be expressed as follows:

Multiplications: 2*117+117^2=13923

Additions: 2*116*117=13804      (3)

This large number of calculations reduces the usefulness of ToF location determination because a wireless device (AP) may only be able to serve a limited number of other wireless devices (STAs). Consequently, various embodiments described herein are directed to reducing the complexity of these calculations.

It should be understood that specific equations, symbols and variables are used herein for purposes of explanation and not limitation. For example, while the number of samples used in the equations above is described as 117, it should be understood that the embodiments are not limited in this respect.

Returning to FIG. 1, one or more of wireless devices 102-1, 102-2 may include location determination logic 210-1, 210-2 (hereinafter LDL 210) in some embodiments. LDL 210 may be operative, in various embodiments, to reduce the complexity of the algorithms and/or mathematical models used to calculate ToF for a LoS wireless signal in a multipath wireless environment. For example, LDL 210 may receive two or more wireless signals over a wireless communication channel. In some embodiments, the two or more wireless signals may comprise a first wireless signal and one or more replicas of the first wireless signal as shown and described above with respect to FIGS. 2 and 3.

Based on the received wireless signals, LDL 210 may determine, select, initiate, etc. a ML solution and/or algorithm to identify a LoS signal of the two or more wireless signals. For example, the ML solution may be preinstalled at the factory, may be selected during configuration, or may be dynamically selected by the wireless device 102 based on the needs of the system. As described above, the ML solution alone may be overly complex. Therefore, the LDL 210 may reduce the complexity of the ML solution to enable less computationally intensive identification As described in more detail below, the ML solution may be reduced in complexity by reducing the complexity for calculating Q(t) for a specific t, scanning merely a small number of t's by utilizing information in Q(t)'s derivative, and/or decimating the input signal by a factor of M (typically 4 or less). The embodiments are not limited in this respect.

Using the reduced complexity ML solution, LDL 210 may determine a time that maximizes the ML solution and/or the cost function Q(t). Based on these determinations, LDL 210 may determine a ToF of the LoS signal and determine a location of the computing/wireless device based on the determined ToF. For example, wireless device 102-1 may determine the location of wireless device 102-2 based on one or more of the foregoing steps.

In various embodiments, LDL 210 may apply a singular value decomposition (SVD) transform to the ML solution to reduce the complexity of the ML solution. One example application of a SVD transform to the ML solution is shown below in equation 4:

[U,S,V]=SVD(L)

$L = U \cdot \sqrt{S} \cdot \sqrt{S} \cdot U^*$

U is an 117*117 unitary matrix

S is a 117*117 diagonal matrix      (4)

Based on the application of the SVD transform, it turns out that only a small number of S's diagonal values are non-zero. In the examples described herein, merely 16 values are non-zero. Therefore, one can transform S into a 16*16 diagonal matrix and transform U into a 117*16 matrix while still maintaining the equations 5 below:

$$L = \tilde{U} \cdot \sqrt{\tilde{S}} \cdot \sqrt{\tilde{S}} \cdot \tilde{U}^* \qquad (5)$$
$$Q(t) = y^* \cdot G \cdot L \cdot G^* \cdot y = \left(y^* \cdot G \cdot \tilde{U} \cdot \sqrt{\tilde{S}}\right)\left(\sqrt{\tilde{S}} \cdot \tilde{U}^* \cdot G^* \cdot y\right)$$

The dimension of one or more matrices derived from the calculations in equation 5 can be expressed as follows:

Y–1*117

G–117*117 diagonal $\tilde{U}$–117*16

$\tilde{S}$–16*16      (6)

Based on these dimension, the number of calculations is greatly reduced from 3 above. For example, the number of calculations required based on the complexity 6 can be expressed as follows:

Multiplications: 117+16+117*16=2005

Additions: 116+15+116*16=1987      (7)

When compared to the number of calculations required at 3, the number of calculations at 7 results in a reduced complexity from 13923 to 2005 multiplications, which comprises a reduction in complexity by a factor of seven.

In various embodiments, the foregoing equations can be summarized as the LDL 210 identifying zero elements in one or more matrices generated using the SVD transform and reducing at least one dimension of at least one of the one or more matrices by removing the zero elements, the zero elements comprising zero's and/or very small numbers forming part of a matrix. In some embodiments, the LDL 210 may delete rows containing zero elements from one or more matrices generated using the SVD transform and delete rows and columns containing zero elements from one or more matrices generated using the SVD transform. Other embodiments are described and claimed.

In some embodiments, the complexity of the ML solution may be reduced based on the LDL logic 210 calculating a derivative of the ML solution and determining a zero crossing of the calculated derivative. For example, the LDL 210 may calculate the analytical derivative of Q(t) and denoted it by dQ(t). As a result, instead of searching for a maximum over Q(t), the search may instead be for a zero crossing over dQ(t). Once the zero-crossing is identified, a finer search can be performed to find dQ(t)=0. In some embodiments, finding a maximum over Q(t) takes 300 iterations. By using the derivate and zero crossing method, the maximum may be found in fewer iterations, e.g. Q(t)=0 may be found in 20 iterations. This reduction may comprise a reduction of complexity of a factor of fifteen.

The LDL 210 may determine the time that maximizes the reduced complexity ML solution based on the determined zero crossing to reduce the complexity of the ML solution as described above. Additionally or alternatively, LDL 210 may determine that the derivative is positive in a first step, determine that the derivative is negative in a second step, isolate a length of time between the first step and the second step, and perform a binary search within the isolated length of time to determine the zero crossing. In this manner, the number of times for which Q(t) and/or dQ(t) must be solved for his greatly reduced. In various embodiments, because dQ(t) is very similar to Q(t), the SVD technique described above may be used in connection with the derivative method to further reduce the complexity of the ML solution and/or for calculating dQ(t). The embodiments are not limited in this respect.

The complexity of the ML solution may be reduced based on LDL 210 decimating a channel estimation of the ML solution in some embodiments. For example, the LDL 210 may evaluate every other, every third or every fourth element of the channel estimation and reduce one or more matrices generated based on the reduced complexity ML solution in each dimension by two, three or four to decimate the channel estimation of the maximum likelihood solution. Based on the decimation of the channel estimation, the LDL 210 may determine the time that maximizes the reduced complexity ML solution to reduce the complexity of the ML solution. Decimating the channel estimation by, for example, a factor of four may reduce the size of the channel estimation from 117 samples to 30 samples. This may comprise a dimension reduction of a factor of four. Other embodiments are described and claimed.

In various embodiments, each of the foregoing complexity reduction methods may be combined to maximize the complexity rejection. For example, the LDL 210 may apply a singular value decomposition (SVD) transform to ML solution, calculate a derivative of the reduced complexity ML solution, determine a zero crossing of the calculated derivative, decimate a channel estimation of the reduced complexity ML solution, and determine the time that maximizes the reduced complexity ML solution based on the decimated channel estimation and the determined zero crossing to reduce the complexity of the maximum likelihood solution. By combining each (or any combination) of these complexity reduction techniques, the complexity for determining the ToF of the LoS wireless signal may be reduced in complexity by a factor of four hundred. For example, the initial complexity for determining the ToF in the examples described herein can be expressed as follows:

Multiplications: $(2*117+117^2)*300=4,176,900$

Additions: $(2*116+116*117)*300=4,141,200$ (8)

Based on the application of each of the above described complexity reduction techniques, the complexity for determining the ToF in the examples described herein can be expressed as follows:

Multiplications: $(30+16+30*16)*20=10,520$

Additions: $(29+15+29*16)*20=10,160$ (9)

As stated above, this may comprise a reduction in computational complexity by a factor of four hundred. This large reduction in complexity may assist wireless devices (APs) service more wireless devices (STAs) in, for example, an indoor navigation environment. Other embodiments are described and claimed.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 4A:
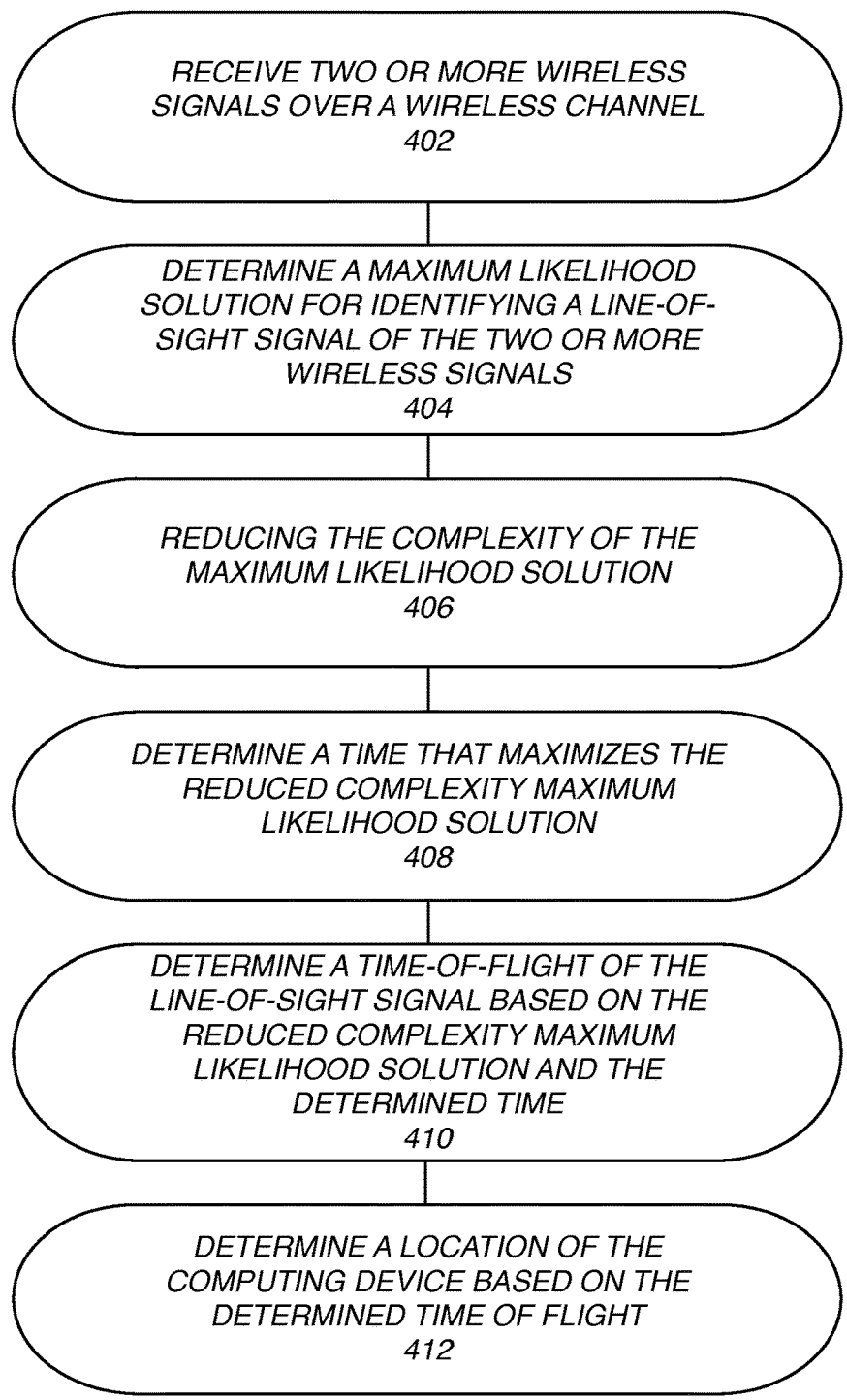
FIG. 4A illustrates an example of a first logic flow.

FIG. 4A illustrates an example of a first logic flow. As shown in FIG. 4A, the logic flow includes a logic flow 400. Logic flow 400 may be representative of some or all of the operations executed by one or more logic, features, or devices described herein, such as wireless devices 102-1, 102-2. More particularly, logic flow 400 may comprise LDL 210 of wireless devices 102-1, 102-1 in some embodiments. The embodiments are not limited in this respect.

In the illustrated example shown in FIG. 4A, logic flow 400 at 402 may comprise receiving two or more wireless signals over a wireless communication channel. For example, as shown in FIG. 2, wireless device 102-2 may receive wireless signal 228 and replica wireless signals 222, 224 and 226 in a multipath wireless environment. In various embodiments, the logic flow 400 at 404 may comprise determining a ML solution for identifying a LoS signal of the two or more wireless signals. For example, LDL 210 may be operative to select or implement a ML solution as described above.

In some embodiments, the logic flow 400 at 406 may comprise reducing the complexity of the maximum likelihood solution. For example, the complexity may be reduced as described above and also as described below with reference to FIGS. 4B, 4C and/or 4D. The logic flow 400 at 408 may comprise determining a time that maximizes the reduced complexity maximum likelihood solution. For example, LDL 210 may determine a time that maximizes the cost function Q(t) to assist in determining a ToF of the LoS signal based on the reduced complexity ML solution and the determined time at 410 of logic flow 400. Based on the determined ToF, the logic flow 400 at 412 may comprise determining a location of the computing device. For example, logic flow 400 may enable one wireless device (e.g. 102-1) to determine and/or track the location of another wireless device (102-2). The embodiments are not limited in this respect.

While described herein in the context of a signal AP device (e.g. 102-1) and a single STA device (e.g. 102-2) where the AP device may identify and/or track the location of the STA device, it should be understood that accurate location and position tracking of the STA device may require a plurality of AP devices. For example, while determining the ToF between devices 102-1 and 102-2 may enable a determination of the distance between the device 102-1 and 102-2, accurate location and/or position determination/tracking may require several (e.g. at least three) distances from different AP's to determine position. Other embodiments are described and claimed.

Figure 4B:
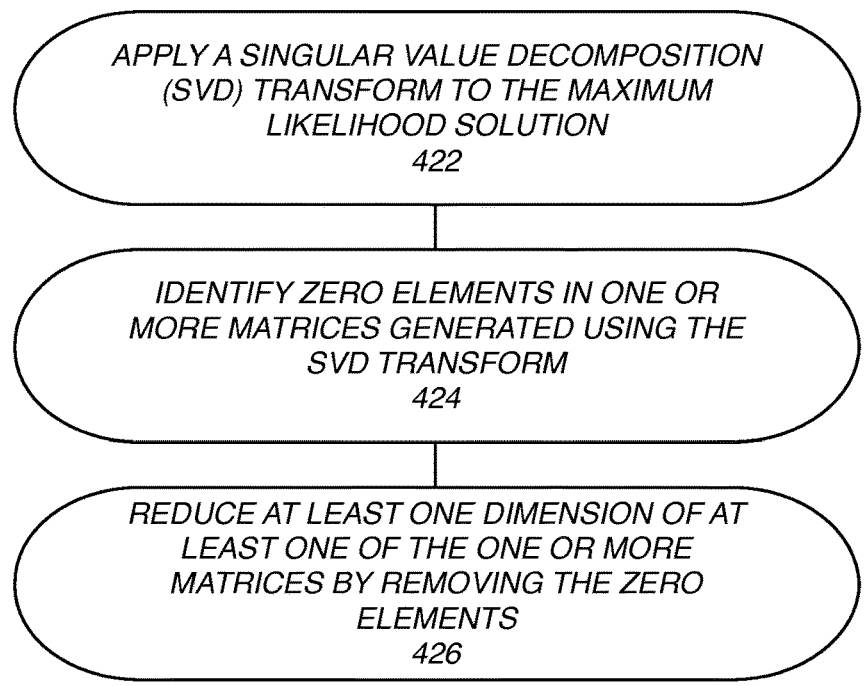
FIG. 4B illustrates an example of a second logic flow.

FIG. 4B illustrates an example of a second logic flow. As shown in FIG. 4B, the logic flow includes a logic flow 420. Logic flow 420 may be representative of some or all of the operations executed by one or more logic, features, or devices described herein, such as wireless devices 102-1, 102-2. More particularly, logic flow 420 may comprise LDL 210 of wireless devices 102-1, 102-1 in some embodiments. In various embodiments, logic flow 420 may be used in addition to logic flow 400 as a technique for reducing the complexity of the ML solution. The embodiments are not limited in this respect.

In various embodiments, the logic flow 420 at 422 may comprise applying a singular value decomposition (SVD) transform to the maximum likelihood solution. For example, as described above, applying a SVD transform to the ML solution may reduce the complexity of the ML solution comprising. The logic flow 420 at 424 may comprise, in some embodiments, identifying zero elements in one or more matrices generated using the SVD transform and at 426 may comprise reducing at least one dimension of at least one of the one or more matrices by removing the zero elements. In other embodiments, not shown in FIG. 4B, the logic flow 420 may additionally/alternatively comprise deleting rows containing zero elements from one or more matrices generated using the SVD transform and deleting rows and columns containing zero elements from one or more matrices generated using the SVD transform. Other embodiments are described and claimed.

Figure 4C:
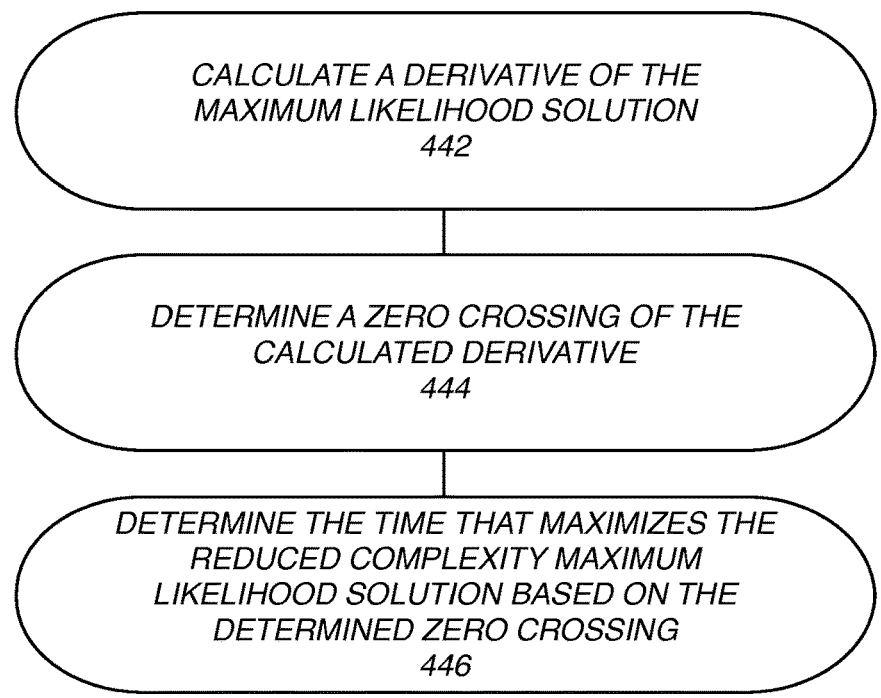
FIG. 4C illustrates an example of a third logic flow.

FIG. 4C illustrates an example of a third logic flow. As shown in FIG. 4C, the logic flow includes a logic flow 440. Logic flow 440 may be representative of some or all of the operations executed by one or more logic, features, or devices described herein, such as wireless devices 102-1, 102-2. More particularly, logic flow 440 may comprise LDL 210 of wireless devices 102-1, 102-1 in some embodiments. In various embodiments, logic flow 440 may be used in addition to logic flows 400 and/or 420 as a technique for reducing the complexity of the ML solution. The embodiments are not limited in this respect.

In various embodiments, the logic flow 440 at 442 may comprise calculating a derivative of the maximum likelihood solution. For example, LDL 210 may calculate a derive dQ(t) of Q(t). At 444 the logic flow 440 may comprise determining a zero crossing of the calculated derivative. For example, LDL 210 may determine that the derivative is positive in a first step, determine that the derivative is negative in a second step, isolate a length of time between the first step and the second step and perform a binary search within the isolated length of time to determine the zero crossing in some embodiments. At 446 the logic flow 440 may comprise determining the time that maximizes the reduced complexity maximum likelihood solution based on the determined zero crossing. The embodiments are not limited in this respect.

FIG. 4D illustrates an example of a fourth logic flow. As shown in FIG. 4D, the logic flow includes a logic flow 460. Logic flow 460 may be representative of some or all of the operations executed by one or more logic, features, or devices described herein, such as wireless devices 102-1, 102-2. More particularly, logic flow 460 may comprise LDL 210 of wireless devices 102-1, 102-1 in some embodiments. In various embodiments, logic flow 460 may be used in addition to logic flows 400, 420 and/or 440 as a technique for reducing the complexity of the ML solution. The embodiments are not limited in this respect.

In some embodiments, the logic flow 460 at 462 may comprise decimating a channel estimation of the maximum likelihood solution. For example, in some embodiments LDL 210 may evaluate every other, every third or every fourth element of the channel estimation and reduce one or more matrices generated based on the reduced complexity maximum likelihood solution in each dimension by two, three or four respectively. In some embodiments, the logic flow 460 at 464 may comprise determining the time that maximizes the reduced complexity maximum likelihood solution based on the decimated channel estimation. For example, by only performing calculations on a subset (e.g. every fourth, etc.) sample, the complexity of the ML solution may be reduced. Other embodiments are described and claimed.

While shown as separate embodiments in FIGS. 4A-4D, it should be understood that any combination of the above-described logic flows 400, 420, 440 and/or 460 may comprise complexity reductions techniques that could be used together and/or separately and still fall within the described embodiments.

Figure 5:
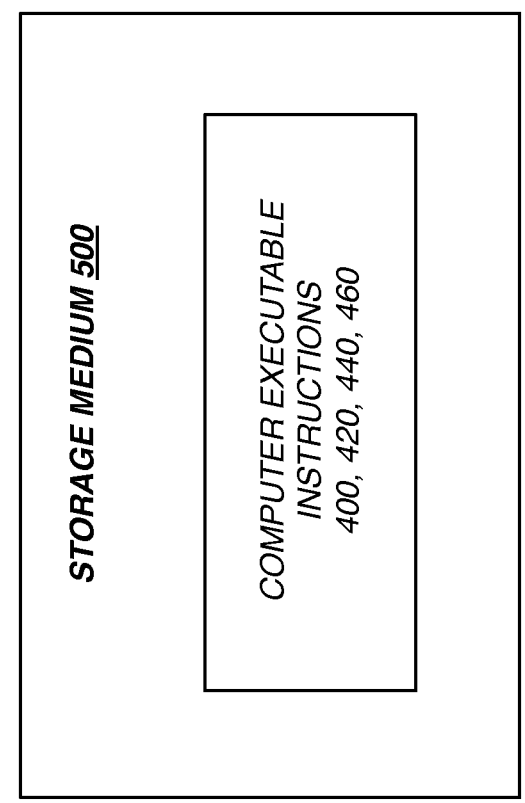
FIG. 5 illustrates an example of a storage medium.

FIG. 5 illustrates an embodiment of a first storage medium. As shown in FIG. 5, the first storage medium includes a storage medium 500. Storage medium 500 may comprise an article of manufacture. In some examples, storage medium 500 may include any non-transitory computer readable medium or machine-readable medium, such as an optical, magnetic or semiconductor storage. Storage medium 500 may store various types of computer executable instructions, such as instructions to implement any of logic flows 400, 420, 440 and/or 460. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
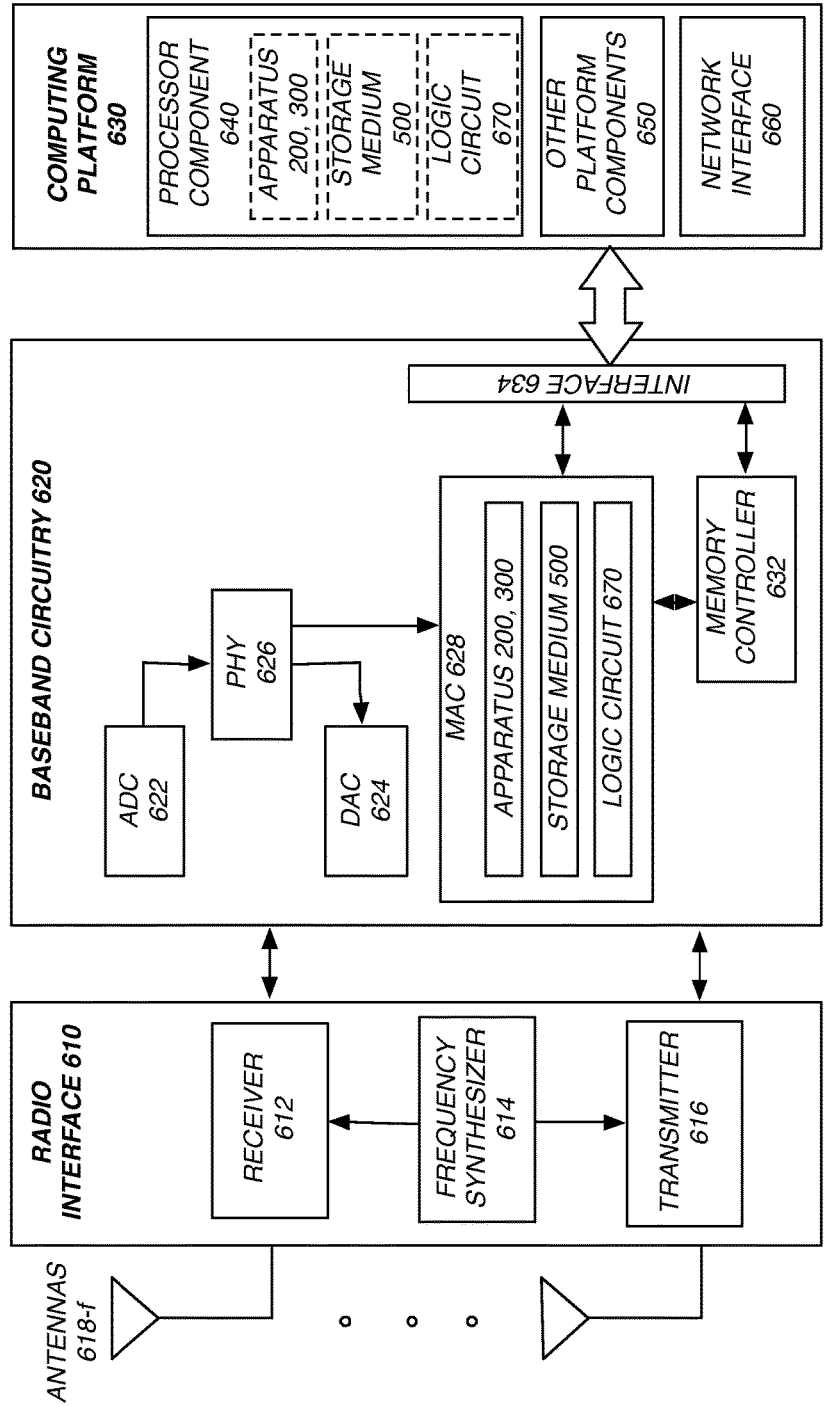
FIG. 6 illustrates an example of a device.

FIG. 6 illustrates an embodiment of a device 600. In some examples, device 600 may be configured or arranged for wireless communications in a wireless network. Device 600 may implement, for example, wireless devices 102-1, 102-2, storage medium 500 and/or a logic circuit 670. The logic circuit 670 may include physical circuits to perform operations described for wireless devices 102-1, 102-2. As shown in FIG. 6, device 600 may include a radio interface 610, baseband circuitry 620, and computing platform 630, although examples are not limited to this configuration.

The device 600 may implement some or all of the structure and/or operations for wireless devices 102-1, 102-2, storage medium 500 and/or logic circuit 670 in a single computing entity, such as entirely within a single device. The embodiments are not limited in this context.

Radio interface 610 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 610 may include, for example, a receiver 612, a transmitter 616 and/or a frequency synthesizer 614. Radio interface 610 may include bias controls, a crystal oscillator and/or one or more antennas 618-f. In another embodiment, radio interface 610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 620 may communicate with radio interface 610 to process receive and/or transmit signals and may include, for example, an analog-to-digital converter 622 for down converting received signals, a digital-to-analog converter 624 for up converting signals for transmission. Further, baseband circuitry 620 may include a baseband or physical layer (PHY) processing circuit 626 for PHY link layer processing of respective receive/transmit signals. Baseband circuitry 620 may include, for example, a processing circuit 628 for medium access control (MAC)/data link layer processing. Baseband circuitry 620 may include a memory controller 632 for communicating with MAC processing circuit 628 and/or a computing platform 630, for example, via one or more interfaces 634.

In some embodiments, PHY processing circuit 626 may include a frame construction and/or detection module, in combination with additional circuitry such as a buffer memory, to construct and/or deconstruct communication frames (e.g., containing subframes). Alternatively or in addition, MAC processing circuit 628 may share processing for certain of these functions or perform these processes independent of PHY processing circuit 626. In some embodiments, MAC and PHY processing may be integrated into a single circuit.

Computing platform 630 may provide computing functionality for device 600. As shown, computing platform 630 may include a processing component 640. In addition to, or alternatively of, baseband circuitry 620 of device 600 may execute processing operations or logic for apparatus 200/300, storage medium 500, and logic circuit 670 using the processing component 630. Processing component 640 (and/or PHY 626 and/or MAC 628) may comprise various hardware elements, software elements, or a combination of both. Examples of hardware elements may include devices, logic devices, components, processors, microprocessors, circuits, processor circuits (e.g., processor circuit 620), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 630 may further include other platform components 650. Other platform components 650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 630 may further include a network interface 660. In some examples, network interface 660 may include logic and/or features to support network interfaces operated in compliance with one or more wireless broadband technologies such as those described in one or more standards associated with IEEE 802.11 such as IEEE 802.11ad.

Device 600 may be, for example, user equipment, a computer, a personal computer (PC), a desktop computer, a laptop computer, a notebook computer, a netbook computer, a tablet computer, an Ultrabook™ computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 600 described herein, may be included or omitted in various embodiments of device 600, as suitably desired. In some embodiments, device 600 may be configured to be compatible with protocols and frequencies associated with IEEE 802.11 Standards for WLANs and/or for wireless docking, although the examples are not limited in this respect.

Embodiments of device 600 may be implemented using single input single output (SISO) antenna architectures. However, certain implementations may include multiple antennas (e.g., antennas 618-f) for transmission and/or reception using adaptive antenna techniques for beamforming or spatial division multiple access (SDMA) and/or using multiple input multiple output (MIMO) communication techniques.

The components and features of device 600 may be implemented using any combination of discrete circuitry, application specific integrated circuits (ASICs), logic gates and/or single chip architectures. Further, the features of device 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to further embodiments.

In example one, a method for determining a time-of-flight (ToF) of a wireless signal in a multipath wireless environment, may comprise receiving two or more wireless signals over a wireless communication channel from wireless device, determining a maximum likelihood solution for identifying a line-of-sight (LoS) signal of the two or more wireless signals, reducing the complexity of the maximum likelihood solution, determining a time that maximizes the reduced complexity maximum likelihood solution, and determining the ToF of the LoS signal based on the reduced complexity maximum likelihood solution and the determined time. Example one may further comprise receiving ToF information from two or more other wireless devices comprising ToF information for a LoS signal between the wireless device and the two or more other wireless device and determining a location of the wireless device based on the determined ToF of the LoS signal and the received ToF information from the two or more other wireless devices.

In example two, the method of example 1 may comprise reducing the complexity of the maximum likelihood solution by applying a singular value decomposition (SVD) transform to the maximum likelihood solution.

In example three, the method of example two may comprise identifying zero elements in one or more matrices generated using the SVD transform, and reducing at least one dimension of at least one of the one or more matrices by removing the zero elements.

In example four, the method of example three may comprise deleting rows containing zero elements from one or more matrices generated using the SVD transform, and deleting rows and columns containing zero elements from one or more matrices generated using the SVD transform.

In example five, the method of example 1 may comprise reducing the complexity of the maximum likelihood solution by calculating a derivative of the maximum likelihood solution, determining a zero crossing of the calculated derivative, and determining the time that maximizes the reduced complexity maximum likelihood solution based on the determined zero crossing.

In example six, the method of example five may comprise determining that the derivative is positive in a first step, determining that the derivative is negative in a second step, isolating a length of time between the first step and the second step, and performing a binary search within the isolated length of time to determine the zero crossing.

In example seven, the method of example 1 may comprise reducing the complexity of the maximum likelihood solution by decimating a channel estimation of the maximum likelihood solution, and determining the time that maximizes the reduced complexity maximum likelihood solution based on the decimated channel estimation.

In example eight, the method of example seven may comprise decimating the channel estimation of the maximum likelihood solution by evaluating every other, every third or every fourth element of the channel estimation, and reducing one or more matrices generated based on the reduced complexity maximum likelihood solution in each dimension by two, three or four.

In example nine, the method of example 1 may comprise reducing the complexity of the maximum likelihood solution by applying a singular value decomposition (SVD) transform to the maximum likelihood solution, calculating a derivative of the reduced complexity maximum likelihood solution, determining a zero crossing of the calculated derivative, decimating a channel estimation of the reduced complexity maximum likelihood solution, and determining the time that maximizes the reduced complexity maximum likelihood solution based on the decimated channel estimation and the determined zero crossing.

In example ten, the two or more wireless signals of example one comprising a first wireless signal and one or more replicas of the first wireless signal.

In example eleven, an apparatus may comprise means for performing the method of any of examples one to ten.

In example twelve, at least one machine-readable medium may comprise a plurality of instructions that in response to being executed on a computing device cause the computing device to carry out a method according to any of examples one to ten.

In example thirteen, a wireless communications device may be arranged to perform the method of any of examples one to ten.

In example fourteen, an apparatus for determining a location of a computing device in a multipath wireless environment may comprise a processor component, a radio coupled to the processor component, and location determination logic to be executed on the processor component to receive two or more wireless signals over a wireless communication channel, determine a maximum likelihood solution to identify a line-of-sight (LoS) signal of the two or more wireless signals, reduce the complexity of the maximum likelihood solution, determine a time that maximizes the reduced complexity maximum likelihood solution, determine a time-of-flight (ToF) of the LoS signal based on the reduced complexity maximum likelihood solution and the determined time, and determine a location of the computing device based on the determined ToF.

In example fifteen, the location determination logic of example fourteen may apply a singular value decomposition (SVD) transform to the maximum likelihood solution to reduce the complexity of the maximum likelihood solution.

In example sixteen, the location determination logic of example fifteen may identify zero elements in one or more matrices generated using the SVD transform and reduce at least one dimension of at least one of the one or more matrices by removing the zero elements.

In example seventeen, the location determination logic of example sixteen may delete rows containing zero elements from one or more matrices generated using the SVD transform and delete rows and columns containing zero elements from one or more matrices generated using the SVD transform.

In example eighteen, the location determination logic of example fourteen may calculate a derivative of the maximum likelihood solution, determine a zero crossing of the calculated derivative, and determine the time that maximizes the reduced complexity maximum likelihood solution based on the determined zero crossing to reduce the complexity of the maximum likelihood solution.

In example nineteen, the location determination logic of example eighteen may determine that the derivative is positive in a first step, determine that the derivative is negative in a second step, isolate a length of time between the first step and the second step, and perform a binary search within the isolated length of time to determine the zero crossing.

In example twenty, the location determination logic of example fourteen may decimate a channel estimation of the maximum likelihood solution and determine the time that maximizes the reduced complexity maximum likelihood solution based on the decimated channel estimation to reduce the complexity of the maximum likelihood solution.

In example twenty-one, the location determination logic of example twenty may evaluate every other, every third or every fourth element of the channel estimation and reducing one or more matrices generated based on the reduced complexity maximum likelihood solution in each dimension by two, three or four to decimate the channel estimation of the maximum likelihood solution.

In example twenty-two, the location determination logic of example fourteen may apply a singular value decomposition (SVD) transform to the maximum likelihood solution, calculate a derivative of the reduced complexity maximum likelihood solution, determine a zero crossing of the calculated derivative, decimate a channel estimation of the reduced complexity maximum likelihood solution, and determine the time that maximizes the reduced complexity maximum likelihood solution based on the decimated channel estimation and the determined zero crossing to reduce the complexity of the maximum likelihood solution.

In example twenty-three, a system for determining a location of a computing device in a multipath wireless environment may comprise a processor component, memory coupled to the processor component, a radio coupled to the processor component, one or more antennas coupled to the radio, and location determination logic to be executed on the processor component to receive two or more wireless signals over a wireless communication channel, determine a maximum likelihood solution to identify a line-of-sight (LoS) signal of the two or more wireless signals, reduce the complexity of the maximum likelihood solution, determine a time that maximizes the reduced complexity maximum likelihood solution, determine a time-of-flight (ToF) of the LoS signal based on the reduced complexity maximum likelihood solution and the determined time, and determine a location of the computing device based on the determined ToF.

In example twenty-four, the location determination logic of example twenty-three may mathematically reduce the complexity of the maximum likelihood solution by reducing the number of calculations required to identify the LoS signal.

In example twenty-five, the mathematical reduction of example twenty-four may comprise one or more of applying a singular value decomposition (SVD) transform to the maximum likelihood solution, calculating a derivative of the reduced complexity maximum likelihood solution and determining a zero crossing of the calculated derivative, or decimating a channel estimation of the reduced complexity maximum likelihood solution and determining the time that maximizes the reduced complexity maximum likelihood solution based on the decimated channel estimation or the determined zero crossing.

The foregoing examples and embodiments are set forth for purposes of illustration and not limitation. As such, other embodiments are described and claimed.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method for determining a time-of-flight (ToF) of a wireless signal in a multipath wireless environment, comprising:
   receiving, via a transceiver, two or more wireless signals over a wireless communication channel from a wireless device;

determining, by processing circuitry, a maximum likelihood solution for identifying a line-of-sight (LoS) signal of the two or more wireless signals;

reducing, by the processing circuitry, the complexity of the maximum likelihood solution;

determining, by the processing circuitry, a time that maximizes the reduced complexity maximum likelihood solution; and determining, by the processing circuitry, the ToF of the LoS signal based on the reduced complexity maximum likelihood solution and the determined time.

2. The method of claim 1, comprising:

receiving ToF information from two or more other wireless devices comprising ToF information for a LoS signal between the wireless device and the two or more other wireless device; and determining a location of the wireless device based on the determined ToF of the LoS signal and the received ToF information from the two or more other wireless devices.

3. The method of claim 1, wherein reducing the complexity of the maximum likelihood solution comprising:

applying a singular value decomposition (SVD) transform to the maximum likelihood solution.

4. The method of claim 3, comprising:

identifying zero elements in one or more matrices generated using the SVD transform; and reducing at least one dimension of at least one of the one or more matrices by removing the zero elements.

5. The method of claim 4, comprising:

deleting rows containing zero elements from one or more matrices generated using the SVD transform; and deleting rows and columns containing zero elements from one or more matrices generated using the SVD transform.

6. The method of claim 1, wherein reducing the complexity of the maximum likelihood solution comprising:

calculating a derivative of the maximum likelihood solution;

determining a zero crossing of the calculated derivative; and determining the time that maximizes the reduced complexity maximum likelihood solution based on the determined zero crossing.

7. The method of claim 6, comprising:

determining that the derivative is positive in a first step;

determining that the derivative is negative in a second step;

isolating a length of time between the first step and the second step; and performing a binary search within the isolated length of time to determine the zero crossing.

8. The method of claim 1, wherein reducing the complexity of the maximum likelihood solution comprising:

decimating a channel estimation of the maximum likelihood solution; and determining the time that maximizes the reduced complexity maximum likelihood solution based on the decimated channel estimation.

9. The method of claim 8, wherein decimating the channel estimation of the maximum likelihood solution comprising:

evaluating every other, every third or every fourth element of the channel estimation; and reducing one or more matrices generated based on the reduced complexity maximum likelihood solution in each dimension by two, three or four.

10. The method of claim 1, wherein reducing the complexity of the maximum likelihood solution comprising:

applying a singular value decomposition (SVD) transform to the maximum likelihood solution;

calculating a derivative of the reduced complexity maximum likelihood solution;

determining a zero crossing of the calculated derivative;

decimating a channel estimation of the reduced complexity maximum likelihood solution; and determining the time that maximizes the reduced complexity maximum likelihood solution based on the decimated channel estimation and the determined zero crossing.

11. The method of claim 1, wherein the two or more wireless signals comprising a first wireless signal and one or more replicas of the first wireless signal.

12. An apparatus for determining a time-of-flight (ToF) of a wireless signal in a multipath wireless environment, comprising:

a processor component;

a radio coupled to the processor component; and location determination logic to be executed on the processor component to receive two or more wireless signals over a wireless communication channel from wireless device, determine a maximum likelihood solution for identifying a line-of-sight (LoS) signal of the two or more wireless signals, reduce the complexity of the maximum likelihood solution, determine a time that maximizes the reduced complexity maximum likelihood solution, and determine the ToF of the LoS signal based on the reduced complexity maximum likelihood solution and the determined time.

13. The apparatus of claim 12, wherein the location determination logic to receive ToF information from two or more other wireless devices comprising ToF information for a LoS signal between the wireless device and the two or more other wireless device, and determine a location of the wireless device based on the determined ToF of the LoS signal and the received ToF information from the two or more other wireless devices.

14. The apparatus of claim 12, wherein the location determination logic to apply a singular value decomposition (SVD) transform to the maximum likelihood solution to reduce the complexity of the maximum likelihood solution.

15. The apparatus of claim 14, wherein the location determination logic to identify zero elements in one or more matrices generated using the SVD transform and reduce at least one dimension of at least one of the one or more matrices by removing the zero elements.

16. The apparatus of claim 15, wherein the location determination logic to delete rows containing zero elements from one or more matrices generated using the SVD transform and delete rows and columns containing zero elements from one or more matrices generated using the SVD transform.

17. The apparatus of claim 12, wherein the location determination logic to calculate a derivative of the maximum likelihood solution, determine a zero crossing of the calculated derivative, and determine the time that maximizes the reduced complexity maximum likelihood solution based on the determined zero crossing to reduce the complexity of the maximum likelihood solution.

18. The apparatus of claim 17, wherein the location determination logic to determine that the derivative is positive in a first step, determine that the derivative is negative in a second step, isolate a length of time between the first step and the second step, and perform a binary search within the isolated length of time to determine the zero crossing.

19. The apparatus of claim 12, wherein the location determination logic to decimate a channel estimation of the maximum likelihood solution and determine the time that maximizes the reduced complexity maximum likelihood solution based on the decimated channel estimation to reduce the complexity of the maximum likelihood solution.

20. The apparatus of claim 19, wherein the location determination logic to evaluate every other, every third or every fourth element of the channel estimation and reducing one or more matrices generated based on the reduced complexity maximum likelihood solution in each dimension by two, three or four to decimate the channel estimation of the maximum likelihood solution.

21. The apparatus of claim 12, wherein the location determination logic to apply a singular value decomposition (SVD) transform to the maximum likelihood solution, calculate a derivative of the reduced complexity maximum likelihood solution, determine a zero crossing of the calculated derivative, decimate a channel estimation of the reduced complexity maximum likelihood solution, and determine the time that maximizes the reduced complexity maximum likelihood solution based on the decimated channel estimation and the determined zero crossing to reduce the complexity of the maximum likelihood solution.

22. A system for determining a location of a computing device in a multipath wireless environment, comprising:
   a processor component;
   memory coupled to the processor component;
   a radio coupled to the processor component;
   one or more antennas coupled to the radio; and
   location determination logic to be executed on the processor component to receive two or more wireless signals over a wireless communication channel from wireless device, determine a maximum likelihood solution for identifying a line-of-sight (LoS) signal of the two or more wireless signals, reduce the complexity of the maximum likelihood solution, determine a time that maximizes the reduced complexity maximum likelihood solution, and determine a time-of-flight (ToF) of the LoS signal based on the reduced complexity maximum likelihood solution and the determined time.

23. The system of claim 22, wherein the location determination logic to receive ToF information from two or more other wireless devices comprising ToF information for a LoS signal between the wireless device and the two or more other wireless device, and determine a location of the wireless device based on the determined ToF of the LoS signal and the received ToF information from the two or more other wireless devices.

24. The system of claim 22, wherein the location determination logic to mathematically reduce the complexity of the maximum likelihood solution by reducing the number of calculations required to identify the LoS signal.

25. The system of claim 24, wherein the mathematical reduction comprising one or more of applying a singular value decomposition (SVD) transform to the maximum likelihood solution, calculating a derivative of the reduced complexity maximum likelihood solution and determining a zero crossing of the calculated derivative, or decimating a channel estimation of the reduced complexity maximum likelihood solution and determining the time that maximizes the reduced complexity maximum likelihood solution based on the decimated channel estimation or the determined zero crossing.

* * * * *